(12) United States Patent
Hu et al.

(10) Patent No.: US 9,129,249 B2
(45) Date of Patent: Sep. 8, 2015

(54) ENHANCING A USER'S SHOPPING EXPERIENCE

(71) Applicants: AT&T Intellectual Property I, L.P., Atlanta, GA (US); AT&T Mobility II LLC, Atlanta, GA (US)

(72) Inventors: Qingmin Hu, Sammamish, WA (US); Jamie Toren, Atlanta, GA (US); Mark Edward Causey, Tucker, GA (US); Brian Kevin Daly, Peachtree Corners, GA (US); Karen Mullis, Loganville, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/027,642

(22) Filed: Sep. 16, 2013

(65) Prior Publication Data
US 2014/0019313 A1    Jan. 16, 2014

Related U.S. Application Data

(63) Continuation of application No. 13/539,345, filed on Jun. 30, 2012, now Pat. No. 8,538,829.

(51) Int. Cl.
*G06Q 30/00* (2012.01)
*G06Q 10/08* (2012.01)
*G06Q 30/02* (2012.01)
*G06Q 30/06* (2012.01)

(52) U.S. Cl.
CPC .......... *G06Q 10/087* (2013.01); *G06Q 30/0251* (2013.01); *G06Q 30/0281* (2013.01); *G06Q 30/06* (2013.01)

(58) Field of Classification Search
CPC ...................................................... G06Q 30/00
USPC ........................................................ 705/26.1
See application file for complete search history.

(56) References Cited

U.S. PATENT DOCUMENTS

| 8,484,099 | B1 * | 7/2013 | Pope et al. ................... 705/26.7 |
| 2008/0245863 | A1 | 10/2008 | Buchheit |
| 2008/0249865 | A1 | 10/2008 | Angell et al. |

(Continued)

OTHER PUBLICATIONS

U.S. Office Action Dated Dec. 26, 2012 in U.S. Appl. No. 13/539,345.

(Continued)

*Primary Examiner* — Mila Airapetian
(74) *Attorney, Agent, or Firm* — Hartman & Citrin LLC

(57) ABSTRACT

The subject disclosure provides systems and methods for enhancing a purchasing experience by enabling a purchaser to receive a variety of real-time updates or recommendations regarding products that the purchaser, such as a user, may need or intend to purchase. A recommendation provided by the system may be based upon comparing the product with a plurality of sources. The recommendation may include a recommendation that a product may near depletion and thus may need to be replaced, a recommendation that the user may already have a sufficient amount or number of the product, a recommendation that the product may or may not match an existing item owned by the user, or a recommendation not to purchase a product. A virtual closet may also be created according the systems and methods of the subject disclosure, allowing users and contacts selected by the user to collaborate on products.

16 Claims, 9 Drawing Sheets

(56) References Cited

U.S. PATENT DOCUMENTS

| | | |
|---|---|---|
| 2009/0210320 A1 | 8/2009 | Adelman et al. |
| 2010/0042469 A1 | 2/2010 | Chandrasekar et al. |
| 2012/0123865 A1 | 5/2012 | Salzano |
| 2012/0183932 A1* | 7/2012 | Chang et al. .......... 434/127 |
| 2012/0311428 A1 | 12/2012 | Goedegebuure |

OTHER PUBLICATIONS

U.S. Notice of Allowance dated May 8, 2013 in U.S. Appl. No. 13/539,345.

* cited by examiner

ENHANCING A USER'S SHOPPING EXPERIENCE

CROSS REFERENCE TO RELATED APPLICATIONS

This patent application is a Continuation of U.S. patent application Ser. No. 13/539,345, entitled "Enhancing a User's Shopping Experience," filed Jun. 30, 2012, now U.S. Pat. No. 8,538,829, which is herein incorporated by reference in its entirety.

BACKGROUND OF THE SUBJECT DISCLOSURE

1. Field of Disclosure

The subject disclosure relates to enhancing a user's shopping experience. More specifically, the subject disclosure relates to providing users with real-time updated information and recommendations on a variety of products the user may need or may intend to purchase.

2. Background of Disclosure

Users often set out to purchase a variety of supplies, whether for personal or household purposes. On many such instances, users may forget or otherwise neglect to personally account for items that they may already have or need before heading out for shopping. For example, a user, on his way home from work, may stop by a grocery store to pick up some fruits, milk, etc. Once home, the user realizes that he or she forgot to also get sodas or that they already had enough milk. The user may further come across a particular clothing product, but may not be sure whether or not it matches their existing wardrobe or may need to be paired with another product that the user does not own. Further, the user may mistakenly purchase a product they do not need or does not fit their purposes, such as the wrong battery type. Even when a user has chosen the correct product, they may purchase it at a price higher than as offered by another nearby merchant, resulting in a less efficient and economically sound purchasing decision. This lack of information may hinder other commercial transactions such as purchasing supplies for a business, including restaurants, etc.

SUMMARY OF THE SUBJECT DISCLOSURE

Embodiments of the present subject disclosure solve these and other problems in the art by providing a method and system for assisting users with real-time updated information and recommendation on a variety of products that a user may need or may intend to purchase.

In one example embodiment, the subject disclosure is a system for enhancing a user's shopping experience. The system includes an inventory server on a network and a logic on the inventory server. The logic is used for retrieving a product information in response to receiving a product identifier from a user, the product identifier corresponding to a product chosen by the user, comparing the product information with a plurality of sources, and providing a recommendation to the user based on a result of the comparison. The recommendation includes at least one of a recommendation to purchase an alternative product, a recommendation to purchase an additional product, and a recommendation to not purchase the product.

In another example embodiment, the subject disclosure is a method for enhancing a user's shopping experience. The method includes retrieving a product information in response to receiving a product identifier from a user, the product identifier corresponding to a product chosen by the user, comparing the product information with a plurality of sources, and providing a recommendation to the user based on a result of the comparison. The recommendation includes at least one of a recommendation to purchase an alternative product, a recommendation to purchase an additional product, and a recommendation to not purchase the product.

In yet another example embodiment, the subject disclosure is a method for enhancing a user's shopping experience. The method includes creating a virtual closet for the user in which a retrieved product information is stored, the product information being retrieved in response to receiving a product identifier from a user, the product identifier corresponding to a product chosen by the user, and monitoring a collaboration between the user and a selected contact to detect a potential product for the user to purchase, the selected contact being allowed by the user to access the virtual closet of the user. The method further provides that upon detecting the potential product, a recommendation including the potential product is provided to the user.

DETAILED DESCRIPTION OF THE SUBJECT DISCLOSURE

Figure 1:
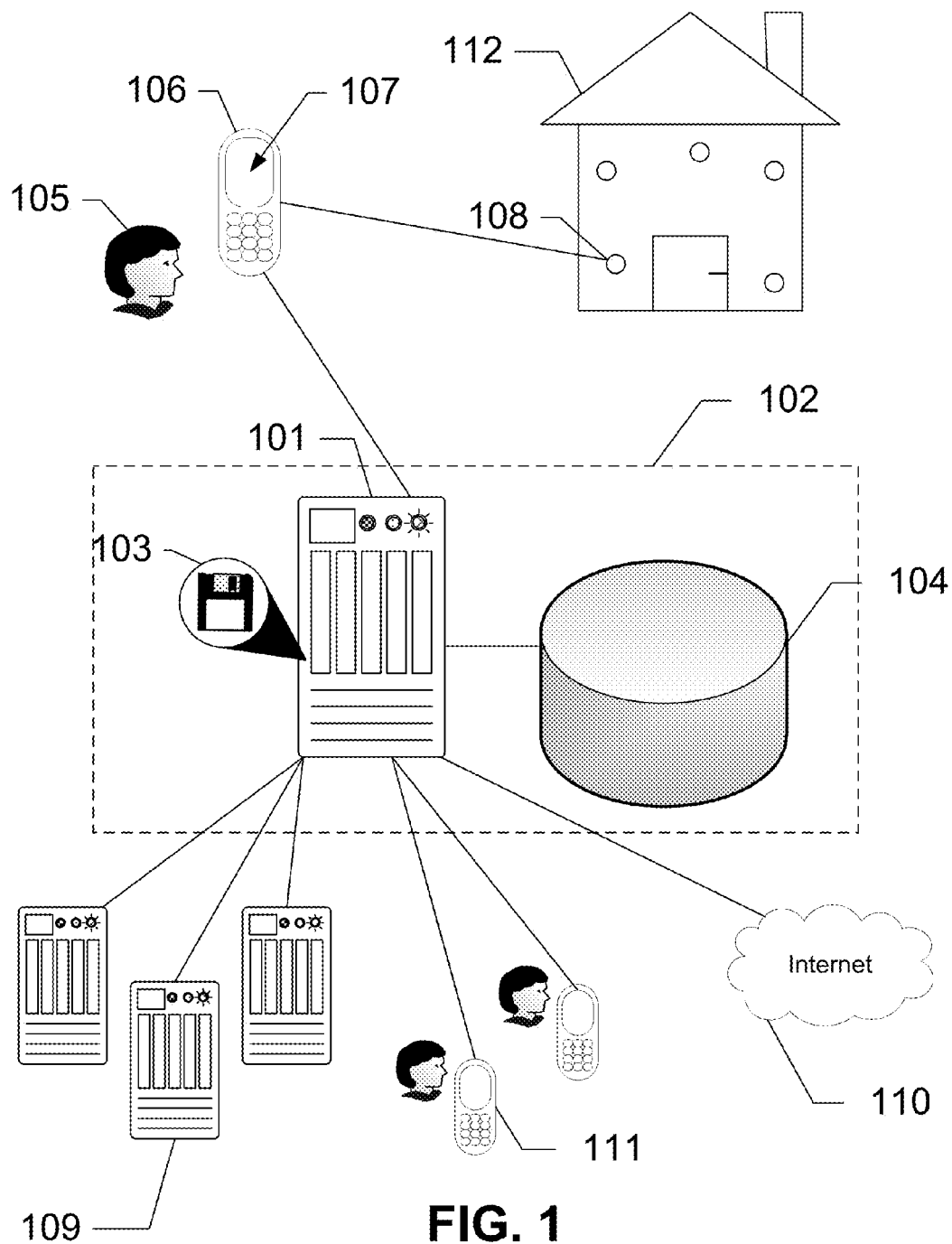
FIG. 1 shows a system for enhancing a user's shopping experience, according to an example embodiment of the subject disclosure.

The subject disclosure provides systems and methods for enhancing a purchasing experience by enabling a purchaser to receive a variety of real-time updates or recommendations regarding products that the purchaser, such as a user, may need or intend to purchase. The inventory system may include an inventory server in communication with a database containing a list of products that the purchaser may have or want. The inventory server may be in communication with a plurality of sensors and scanning devices that may be located inside a user's house or on a mobile device operated by the purchaser. The inventory system may also be in communication with a variety of merchant servers, as well as with other sources of information that may be used to provide recommendations to the purchaser before they purchase a product.

The inventory server may monitor a state of a product owned by the user via a variety of sensors and/or scanners. As a quantity of the product nears depletion, the inventory system may alert the user regarding a need to replace the product. The alert may be provided via an application on the user's mobile device, or by any other means. The inventory server may also provide recommendations to the user, if the inventory server determines that the user is purchasing a product that the user may already have a sufficient amount or number of. Furthermore, the inventory server, by keeping track of products belonging to the user, may provide recommendations as to possible alternative or complementary products. The inventory server may even recommend alternative products of a different quality along with advantages or disadvantages of the alternative product. These recommendations may include information from a variety of sources, such as user reviews and expert opinions available on the Internet, ratings and/or recommendations from a group of selected friends, the user's past purchasing habits, etc. For instance, with respect to shopping for clothes, a user may create a virtual closet, which he or she may then electronically share with selected friends. The user and his or her friends may be able to collaborate on a particular clothing item they may wear to a particular event, share items of clothing instead of purchasing them, provide fashion recommendations to each other, collaborate on gift ideas, etc.

Upon examining or scanning a product selected by a user for purchase, the inventory system may determine that the product is not the right kind or type that the user needs or may be looking for. The inventory server may contact a merchant selling that or similar products in order to obtain information as to where in a store the right product may be found. The inventory server may then forward this information to the user's device accordingly. In the alternative, if the inventory server cannot obtain a location for the right product, a sales representative may be summoned to attend to the user to provide additional information.

In addition to contacting the merchant server as described above, the inventory server may send a notification to other merchants regarding the user's desire for a product. In response, the other merchants may provide discounts or coupons to the user regarding the right product. The notification may be transmitted to servers operated by the other merchants based on the geographical location of the user, merchants from whom the user may have purchased products in the past, a list of specific merchants designated by the user as preferred alternatives, etc. Further, the response from the other merchants' servers may be transmitted via any local or wide area network back to the inventory server, or directly to a mobile device operated by the user, depending upon a preference of the user, and perhaps upon a contractual relationship between the operator of the inventory server and the other merchant(s).

The inventory server, upon determining that the user may be purchasing a product, may provide the user with a message that may include a price comparison across a variety of merchants that provide the right product. This may happen regardless of whether the product is what the user has initially chosen or a different one based on the provided recommendation. The recommendation may enable the user to make a sound, economical decision as to which merchant to make a purchase from. The list of merchants provided to the user may be based on the geographical location of the user, merchants from whom the user may have purchased products in the past, or may be a list of specific merchants designated by the user as the only merchants from whom the user may be willing to purchase products.

FIG. 1 shows a system for enhancing a user's shopping experience, according to an example embodiment of the subject disclosure. The system can include an inventory sever 101 that may be located on a network 102 or on a user's personal computer. Inventory server 101 may include an inventory logic 103 and may be in communication with a database 104 for storing an inventory of products belonging to a user 105. Inventory logic 103 may be comprised by digital and/or analog hardware circuits, for example, hardware circuits comprising logical AND, OR, XOR, NAND, NOR, and other logical operations, as well as being formed from combinations of software and hardware. Network 102 may include broadband wide-area networks such as cellular networks, local-area networks (LAN), and personal area networks, such as near-field communication (NFC) networks including BLUETOOTH®, or any combination thereof. Network 102 enables communication with other merchant servers 109. User 105 may sign-up to utilize the home inventory system. User 105 may sign up by downloading an application 107 on a mobile device 106 and creating a profile on server 101. Application 107 may also be available to user 105 via a web browser on a personal computer through which the user may be able to access the Internet. This may be useful for allowing users who may not have a mobile device or their device may not be with them at all times, to be able to access the inventory system. Mobile device 106 may be any electronic device including mobile cellular phones having capability to connect to the internet, a tablet computer such as an Apple iPad or Samsung Galaxy, a laptop computer, a pager, etc. Mobile device 106 may also include one or more of an optical scanner for scanning barcodes, a radio frequency identification (RFID) reader, and a camera for taking pictures of products. Barcodes may be any of linear barcodes, 2-dimensional matrix barcodes, or any identifier capable of being scanned, and may serve to identify a particular product. Mobile device 106 may also be in contact with a variety of sensors 108 that may be located throughout a house 112 belonging to user 105. Sensors 108 may include any of an RFID reader, an optical sensor, a weight sensor, a tag reader, etc. Sensors 108 may periodically communicate a detected product identifier to mobile device 106, which through application 107 may transmit the information to inventory server 101. User 105 may also input a product identifier into application 107 manually by typing in the product information. Sensors 108 may also be able to directly communicate their data with server 101. For example server 101 may be local and may even be the same as the user's personal computer. Sensors 108 may be able to communicate directly with the user's personal computer without having to transmit their data through mobile device 106. Whether through sensors 108 or mobile device 106, a product identifier related to products user 105 has or intends to purchase may be transmitted to inventory server 101. To facilitate this transmission, as well as any communication with sensors 108 and other devices, mobile device 106 may include appropriate transceivers, such as network adapters, subscriber identity module (SIM) or universal integrated circuit cards (UICC), etc. Further, mobile devices such as device 106 may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device.

Logic 103 may examine and decode the received product identifier using one or more algorithms included within logic 103. These algorithms may include a symbology decoding algorithm for decoding scanned barcodes or image processing algorithm for extracting product information from images taken of a particular product. Thereafter, logic 103 may communicate with database 104 to determine whether or not related product information already exists in database 104. If no results are returned, logic 103 may direct inventory server 101 to communicate with a variety of sources on Internet 110 or other wide-area network to extract additional information related to a product associated with the product identifier. The variety of sources used by inventory server 101 may include public databases, commercial websites such as EBAY®, AMAZON®, commercial retail stores' databases, user reviews, or any other relevant source that may contain relevant product information. The extracted product information may then be communicated back to user 105 for confirming that the product information corresponds to the product chosen by user 105.

User 105 may customize database 104 by creating a variety of product categories under which similar products' information may be saved. User 105 may designate which product may be saved under which category and may set different levels of security for different categories. For example, user 105 may allow only close friends to view product information related to user's clothing items. User 105 may even create a virtual closet resembling the user's actual closet containing personal aesthetic products. The virtual closet can be shared with designated contacts and allow user 105 and the designated contacts to collaborate on any item contained in the virtual closet as further described herein. These customizations, as well as other settings such as adding designated contacts, etc., may be performed via application 107 on mobile device 106, or by any other device in communication with inventory server 101 or database 104.

Inventory server 101 may also be in communication with a variety of external sources. For example, inventory server 101 may communicate with a merchant server such as merchant server 109 from whom user 105 may be currently making a purchase thus providing user 105 with information on the right product or summoning the help of a merchant's sales representative for providing user 105 with more information on the right product. Inventory server 101 may communicate with a plurality of other merchant servers to further provide user 105 with price comparison or coupons offered by other merchants. Inventory server 101 may also communicate with an outside expert source via Internet 110 for providing latest expert opinions on a particular product or related products, as well as finding the latest trends in a related industry by referencing additional sources. These expert sources may be retrieved from any of an online forum, an online magazine, a blog, a discussion forum, etc. Inventory server 101 may use such information extracted from the Internet 110 to provide feedback and recommendations on the particular product to user 105.

Inventory server 101 may also communicate with one or more contacts 111. The contacts may be other users such as user 105, or may simply be individuals designated by the user 105. For instance, the user 105 may designate contacts 111 as people from whom the user 105 may want to receive a recommendation when purchasing a particular product. For example, the user 105 may desire to receive feedback from friends as he or she is buying a pair of shoes. Thus, inventory server 101 may communicate with friends 111 and thereafter forward their recommendations to the user 105.

Figure 2A:
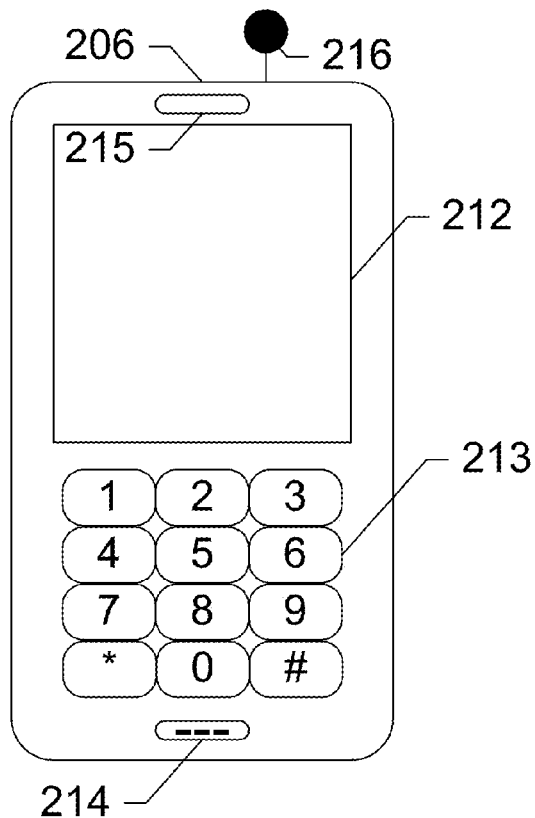
FIG. 2A-B shows a mobile device configured to capture a product identifier, according to an example embodiment of the subject disclosure.
Figure 2B:
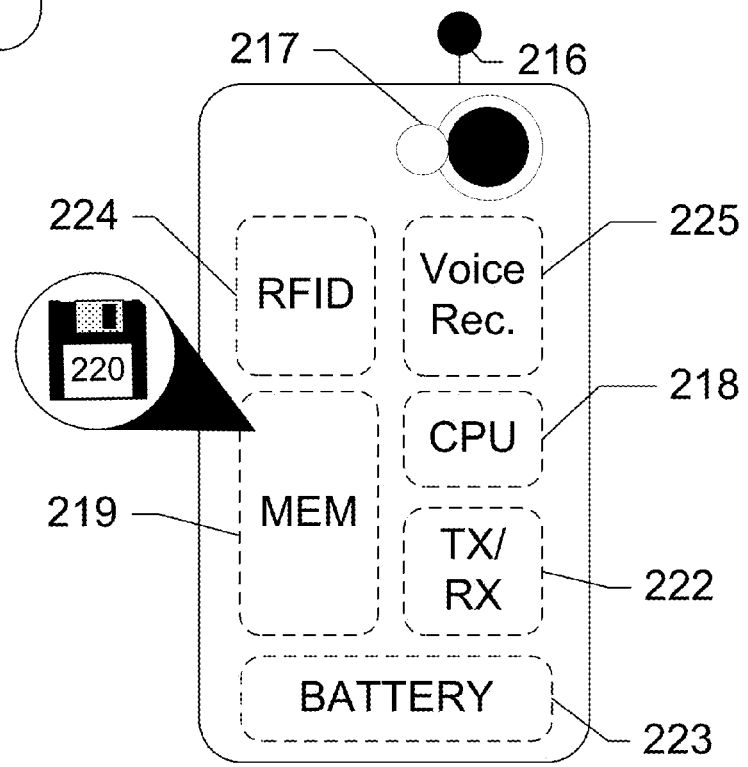

FIGS. 2A-B show a mobile device configured to capture a product identifier, according to an example embodiment of the subject disclosure. FIG. 2A shows a mobile device 206, including a display 212, an input 213, a microphone 214, a speaker 215, and an antenna 216. Display 212 may be used as visual output for mobile device 206, and may be any of the currently known or later developed display technologies including Light Emitting Display (LED), Liquid Crystal Display (LCD), Electroluminescent Display (ELD), Organic Light Emitting Diode (OLED), Carbon nanotubes, nanocrystal displays, etc. For example, display 212 may show a captured product identifier, as well as any retrieved product information such as a name of the product, a brand of the product, a manufacturer of the product, and a thumbnail of the product, and a message corresponding to a recommendation that may be provided by the inventory server. Input 213 may be a keypad used, for example, for entering a product identifier including barcodes, product name, etc. Display 212 may also incorporate a touch screen technology thus allowing an alternative to using input 213. Mobile device 206 may further include a microphone 214 through which voice communication of a product identifier to the inventory server may be possible. Microphone 214 may also be used for aural input, and for voice-commands, such as activating voice-activated functions of mobile device 206. For example, when capturing a product identifier such as a barcode may not be possible through RFID readers or cameras, a user may speak the numbers below a barcode to be sent to the inventory server. Mobile device 206 may further include a speaker 215, through which the inventory server may communicate information back to the user including retrieved product information, provided recommendations, requests for more product identifiers, etc. Microphone 214 and speaker 215 may utilize any currently known or later developed technologies including current speakers being employed in user mobile devices. Audio output through external speakers is also possible, such as headsets, hands-free systems, etc. Antenna 216 may be a transducer for transmitting and receiving wireless radio frequency (RF) signals to and from wireless networks, network nodes, and other wireless communication devices including a wireless base transceiver station (BTS), WI-FI access point, etc.

Referring now to FIG. 2B, additional components of mobile device 206 may include a camera 217, a processor 218, a memory 219 storing logic 220, a transceiver 222, a battery 223, and an RFID reader 224. Camera 217 may be any photo-sensitive input device that may be used to capture a product identifier. Through camera 217, a barcode of a product may be scanned and subsequently sent via transceiver 222 to an inventory server. Camera 217 may also be used to capture an image of a product, which may subsequently be sent via transceiver 222 to the inventory server.

Mobile device 206 may further include a processor 218 used to execute various functions when instructed to do so by programs and other logic stored on memory 219, or on other data storage of mobile device 206. Processor 218 can incorporate any presently known or later developed technologies including computer processors (processing units), microprocessors, digital signal processors, controllers and microcontrollers, etc. Logic 220 may include an operating system to provide an environment for a user to interact with mobile device 206, including managing inputs and outputs for use with programs running within the operating system. For instance, logic 220 may include a touch screen logic for receiving touch input from display 212 and associating the touch input with a function.

Furthermore, logic 220, when combined with a transceiver 222, may be used to transmit a product identifier and receive data and signals including retrieved product information as well as any recommendations from an inventory server. Transceiver 222 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Battery 223 may be used to power mobile device 206. Battery 223 can be any of the presently known or later developed technologies used in mobile devices or used in powering communication components including Lithium-Ion batteries, lithium-polymer batteries, molten salt batteries, etc.

Mobile device 206 may further include an RFID reader 224. RFID reader 224 may be used to wirelessly capture a product identifier of products that may have RFID tags. Data transfer between an RFID tag and an RFID reader may be performed based on using radio-frequency electromagnetic fields. Logic 220 may include a voice recognition algorithm. When a user speaks a product identifier using microphone 214, the voice recognition algorithm may record what is being spoken. Logic 220 may process what was recorded and may then convert it to text to be sent to the inventory server via transceiver 222.

Many wireless communication devices may have more than one transceiver or a transceiver that supports more than one protocol. A single wireless communication device can support cellular radio frequency (RF), GSM, GPRS, UMTS, W-CDMA, LTE, NFC, WI-FI, BLUETOOTH®, ZIGBEE®, and Z-WAVE® protocols. A wireless communication device capable of multiple modes of wireless communication, such as cellular, WI-FI, NFC, etc., may contain a plurality of antennas on a single device. For example, an NFC-enabled wireless communication device may have separate antennas for cellular and NFC communications.

Figure 3:
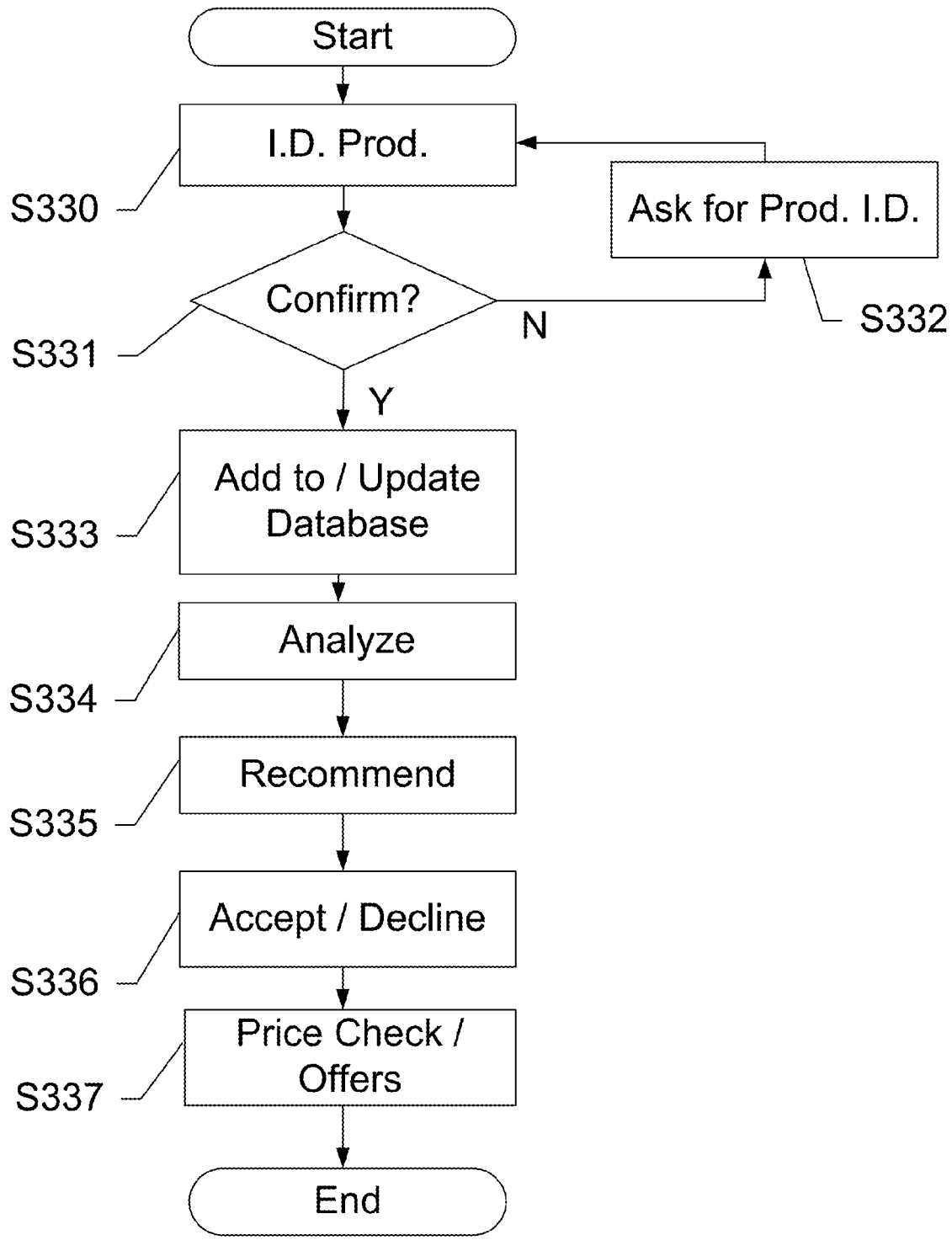
FIG. 3 shows a method for enhancing a user's shopping experience, according to an example embodiment of the subject disclosure.

FIG. 3 shows a method for enhancing a user's shopping experience, according to an example embodiment of the subject disclosure. The user may have located a product, which he or she may want to purchase. The product may include any personal items, business supplies, or household products. The located product may include a product identifier such as a barcode, an RFID tag, etc., which may be captured and communicated to an inventory server such as inventory server 101. The product identifier may be captured by scanning a barcode of the product using a scanner or a camera, by reading product information off an RFID tag attached to the product using an RFID reader, or by capturing an image of the product using a camera. A user may also enter the product identifier manually by keying in or speaking relevant information such product brand, name, etc.

The method may begin with a logic, such as the logic 103, embedded in the inventory server 101 identifying a product information corresponding to the product identifier captured and sent by the user 105 (S330). This identification step may include querying a database such as database 104 to determine if the product information may have been saved previously. If not, the product may be identified by looking at various sources on the Internet, to extract the product information. The product information corresponding to the product identifier may include a name of the product, a brand of the product, a manufacturer of the product, etc. and even a thumbnail of the product. If the product information can be found, the result may be communicated back to the user 105 to confirm that the extracted product information correspond to what the user 105 may be looking for. However, if relevant product information cannot be found, the inventory server 101 may suggest a variety of similar and alternative products to the user 105 to choose from.

Next, the inventory server 101 may send the relevant product information to the user 105 for the user 105 to either confirm or reject (S331). If the user 105 rejects the product information as incorrect, the inventory server 101 may ask the user 105 to provide more information regarding the product (S332). The user 105 may be able to manually enter any additional information useful in identifying the product. For example if capturing the product's barcode may not be possible through a scanner, an RFID reader, etc., the user 105 may manually enter the barcode. The user 105 may even be able to speak in the barcode, which may be recorded, converted to text and accordingly transmitted back to the inventory server 101. The user 105 may further be provided with a list of products in confirmation S331, and select the appropriate product or provide additional information in S332. Thereafter the process may revert back to S330 to identify the product corresponding to the provided product identifier. Once a positive confirmation is received from the user 105 in S331, the logic 103 on the inventory server 101 may query a database 104 to determine whether or not the identified product already exists in a profile associated with the customer. The product information may be entered into the database 104 or may be updated in the database 104 depending on whether the product information already exists in the database 104 or the product information is new (S333). Types of product information that may be saved in the database 104 include a product identifier, a product name, a product brand, a product manufacturer, a product distributor, date of purchase, frequency of purchase implying how often the user 105 may purchase the exact same product or similar products, quantity of the product, weight of the product, expiration date of the product, etc.

The logic 103 on the inventory server 101 may then perform a variety of analyses on the identified product information (S334). For example, the logic 103 on the inventory server 101 may query the database 104 for similar products that the user 105 may already have. For example, a user 105 may have provided information regarding a red shirt. The logic 103 may query a clothing category in the database 104 to see what other similar or matching products the user 105 may already have in their inventory or their virtual closet. The logic 103 may conclude that the user 105 needs a red shirt and may provide user 105 with recommendation on higher quality shirts (S335). In the alternative, the logic 103 may determine that the user 105 may already have a pair of white pants. The logic 103 on the inventory server 101 may determine that the user 105 may be making the purchase during spring season and, as a result, may direct the server 101 to search the Internet for spring fashion trends. This may include mining expert sources such as websites, forums, etc. for opinions from fashion designers and others as to what might match white pants. Through these outside expert sources, the logic 103 may conclude that yellow shirts and white pants may be the latest trend this spring, and provide a corresponding recommendation S335. Further, the logic 103 may also determine from data available in the database 104 that the user 105 may not have any yellow shirts. As a result, inventory server 101 may provide a corresponding recommendation to the user 105 (S335), indicating that a yellow shirt may be a better match and may further provide information on where the user 105 may be able to find a yellow shirt. Inventory server 101 may also determine that the user 105 may not have a pair of blue pants that may be a match for the chosen red shirt. This determination may again be done through outside expert sources. As a result, inventory server 101 may recommend that the user 105 may want to consider purchasing a pair of blue pants and furthermore provide the user 105 with information on where he or she may be able to purchase the pair of blue pants (S335). Multiple recommendations may be provided, with each recommendation being scored or ranked according to any number of factors, such as a number of sources pointing to a specific recommendation, an assigned value to the expert source, etc. These values and rankings may be based on preferences provided beforehand by the user 105 itself, or may be sourced from feedback from several additional users who use the system.

Regardless of the type of recommendation the user 105 may receive from the inventory server 101, the user 105 may be given an option to either accept or decline the recommendation (S336). Should the user 105 accept the product recommended by the inventory server 101, the inventory server 101 may perform a price check and comparison for the accepted recommended product along with any sales, coupons, discounts, etc. offered across a variety of merchants that may be selling the recommended product, and may subsequently present the results to the user 105 (S337). Should the user 105 decline the recommended product and decided decide to stick with purchasing the product chosen initially, (for instance, the red shirt in the example above), the inventory server 101 may perform a similar price check and comparison as above but this time for the product chosen initially by the user 105. The selection of merchants among which the price check and the comparison are performed may be based on a geographical location of the user 105, past purchases, a list of specific merchants designated by the user 105, etc.

Figure 4A:
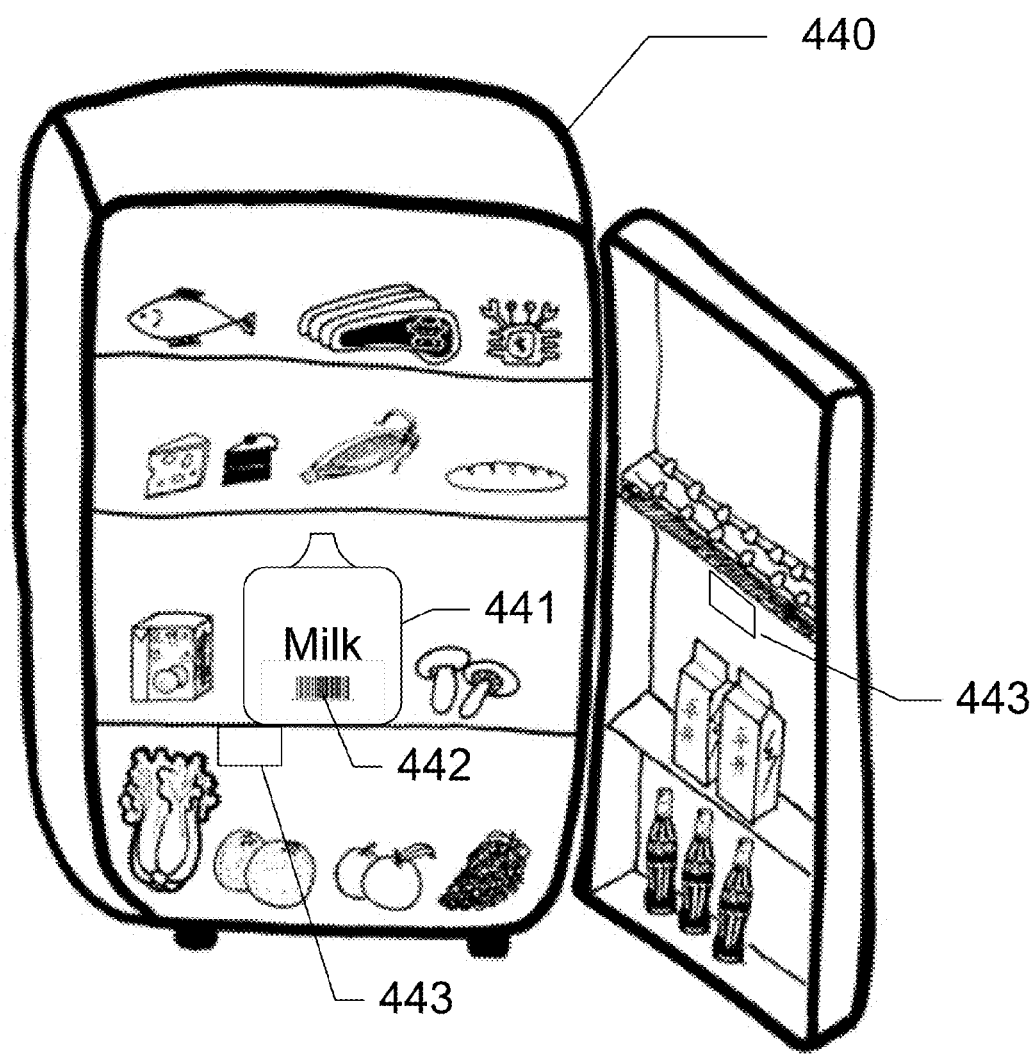
FIGS. 4A-B show a setting for monitoring a state of a food product, according to an example embodiment of the subject disclosure.
Figure 4B:
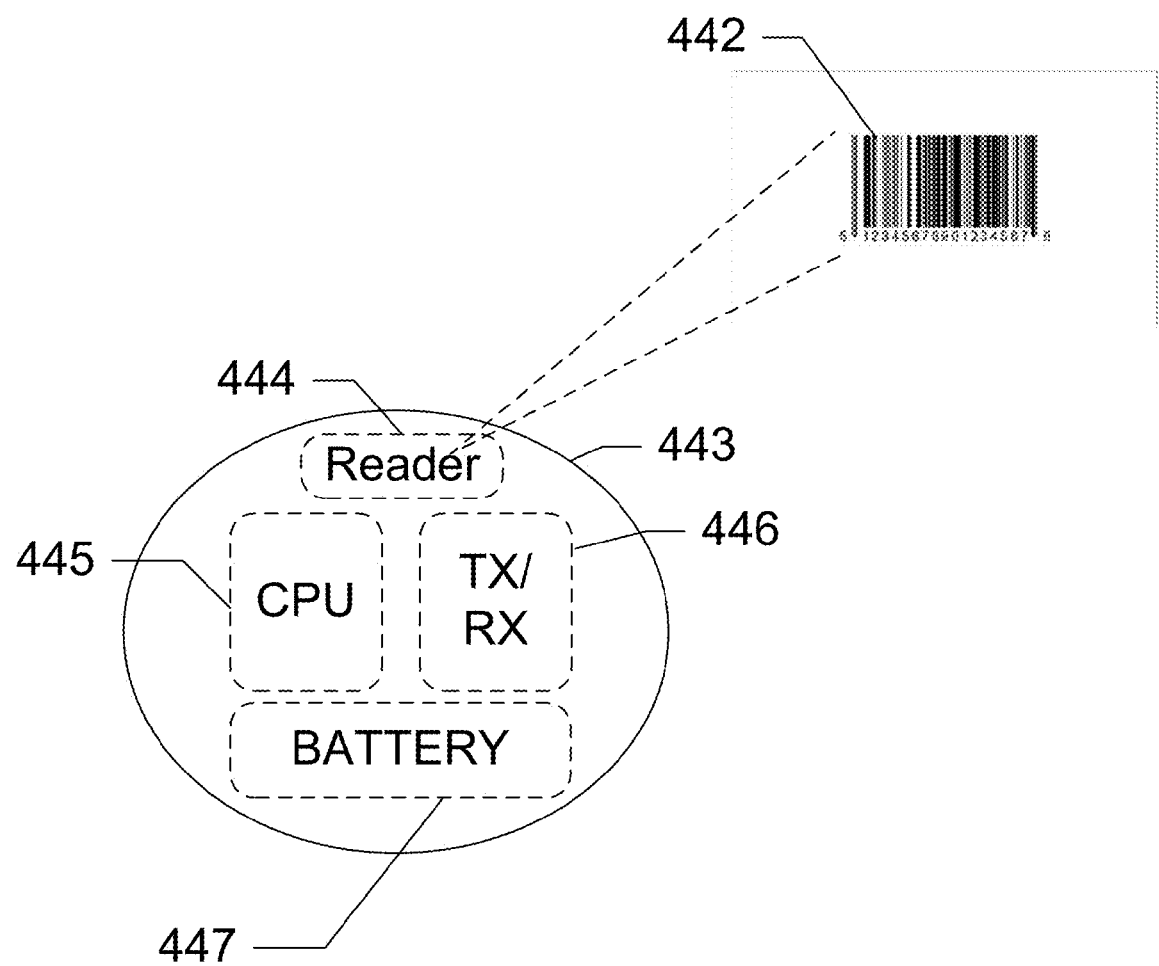

FIGS. 4A-B show a setting for monitoring a state of a food product, according to an example embodiment of the subject disclosure. FIG. 4A shows an example embodiment in which a refrigerator is equipped with a plurality of sensors including optical scanners, weight sensors, and RFID readers for monitoring products kept in the refrigerator. A refrigerator 440 is shown in FIG. 4A, in which a variety of products may be kept including fruits, breads, juices, meat, canned food, etc. Shown therein is also a container 441 containing milk. Container 441 may include a barcode 442 that may be scanned using one or more sensors 443. When a user 105 initially places container 441 in refrigerator 440, one of sensors 443 may scan barcode 442. The scanned barcode 442 may be communicated to a mobile device such as mobile device 106. The mobile device 106 may then forward the scanned barcode 442 to an inventory server 101, which in turn would save any product information corresponding to barcode 442 in a database such as database 104. If an entry already exists in the database 104, the product information corresponding to the scanned barcode 442 may be updated in the database 104. The product information may be stored in a food category within the database 104. Sensor 443 may be an optical sensor, a weight sensor, an RFID reader, or any combination thereof. Once an entry is made for the milk, sensor 443 may continuously monitor the state of milk contained in container 441. Monitoring the state of the milk may include monitoring the amount of milk left, expiration date of the milk, weight of the milk, etc.

FIG. 4B shows the inner components of sensor 443, according to an example embodiment of the subject disclosure. The inner components of sensor 443 may include a reader 444, a processor 445, a transceiver 446, and a battery 447. Reader 444 may include any currently known or later developed technologies capable of identifying a product identifier including an optical reader, an RFID reader, a scanner, a camera etc. Barcode 442 is initially captured using reader 444. Processor 445 may be used to execute various functions when instructed to do so including facilitating transfer of data from reader 444 to transceiver 446 for communication with the mobile device. Processor 445 can incorporate any presently known or later developed technologies including computer processors (processing units), microprocessors, digital signal processors, controllers and microcontrollers, etc.

Transceiver 446 may be in communication with the mobile device. Such communication may be used to transmit and receive data and signals including product information or commands to monitor the state of product 441, to and from processor 445 of sensor 440. Transceiver 446 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Battery 447 may be used to power sensor 443. Battery 447 can be any of the presently known or later developed technologies used in sensor devices for powering communication components including Lithium-Ion batteries, lithium-polymer batteries, molten salt batteries, cell batteries, etc.

Figure 5:
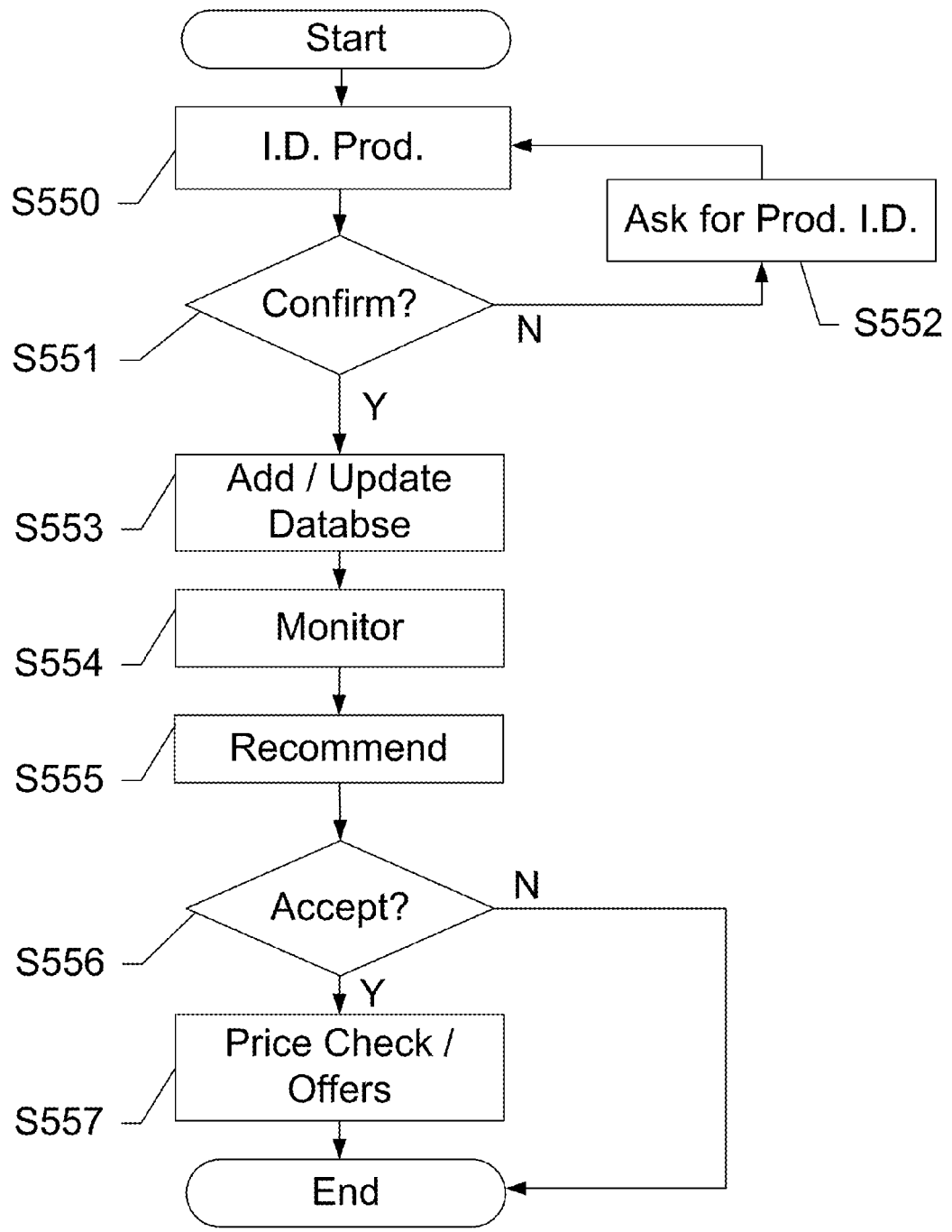
FIG. 5 shows yet another method for enhancing a user's shopping experience by monitoring a state of a product that the user may have, according to an example embodiment of the subject disclosure.

FIG. 5 shows yet another method for enhancing a user's shopping experience by monitoring a state of a product that the user may have, according to an example embodiment of the subject disclosure.

The method may begin with a logic 103 embedded in the inventory server 101, identifying a product information corresponding to the product identifier captured by a sensor such as sensor 440 (S550). The logic 103 may query a database such as database 104, to determine if the product information may have been saved previously. If not, the logic 103 may direct the inventory server 101 to look at various sources on the Internet, to extract the product information. The product information corresponding to the product identifier may include a name of the product, a brand of the product, a manufacturer of the product, etc. and even a thumbnail of the product. If the product information can be found, the result may be communicated back to the user 105 to confirm that the extracted product information corresponds to what the user 105 may be looking for. The inventory server 101 may send the relevant product information to the user 105 for the user 105 to either confirm or reject (S551). If the user 105 rejects the product information as incorrect, the inventory server 101 may ask the user 105 to provide more information regarding the product (S552). The user 105 may be able to manually enter any information useful in identifying the product. For example if capturing the product's barcode may not be possible through a scanner, an RFID reader, etc., the user 105 may manually enter the barcode. The user 105 may even be able to speak in the barcode, which may be recorded, converted to text and accordingly transmitted back to the inventory server 101. Thereafter the process may revert back to S550 to identify the product corresponding to the provided product identifier. Upon receiving confirmation from the user 105, the product information may be added to the database 104 if the product has never been saved before and if an entry for the identified product exists in the database 104, the product information may be updated (S553). For example, if a user 105 purchases milk, of which an entry may already exist in the database 104, the product information corresponding to the milk may be updated including date of purchase, amount, weight, date of expiration, brand, type of milk, etc. Thereafter, the state of the product entered/updated in the database 104 may be continuously monitored (S554). The inventory server 101 may monitor the state of the milk using, for example, a set of weight sensors located inside the refrigerator. The weight of the product may be monitored at a default time interval or at a user specified time intervals, i.e. once every 24 hours. The threshold may be specified by the user 105 or may be set automatically by the inventory server 101. The inventory server 101 may monitor a behavior of the user 105 as it may relate to consumption of milk and over time may adaptively learn when the user 105 might purchase a new replacement for a depleting source of milk. For example, the inventory server 101 may learn over time that during the winter time the user 105 buys milk every week or that whenever the weight of the milk falls below half a gallon, the user may replace the milk.

Thereafter, the inventory server 101 may provide a recommendation and feedback to the user 105 every week during winter that milk may be running out and a replacement may be needed or in the alternative may provide a recommendation to the user 105 whenever the amount of milk left falls below half a gallon (S555). The user 105 may then be given an option to accept the recommendation or not (S556). The user 105 may choose not to accept the recommendation, at which point the process may end. The user 105 may also choose to accept the recommendation. Should the user accept the product recommended by the inventory server 101, the inventory server 101 may perform a price check and comparison for the product that may need to be replaced along with any sales, coupons, discounts, etc. offered across a variety of merchants that may be selling the recommended product, and may subsequently present the results to the user 105 (S557). The selection of merchants across which the price check and the comparison is performed may be based on the geographical location of the user 105, past purchases, a list of specific merchants designated by the user 105, etc. At this point the process may end.

Figure 6:
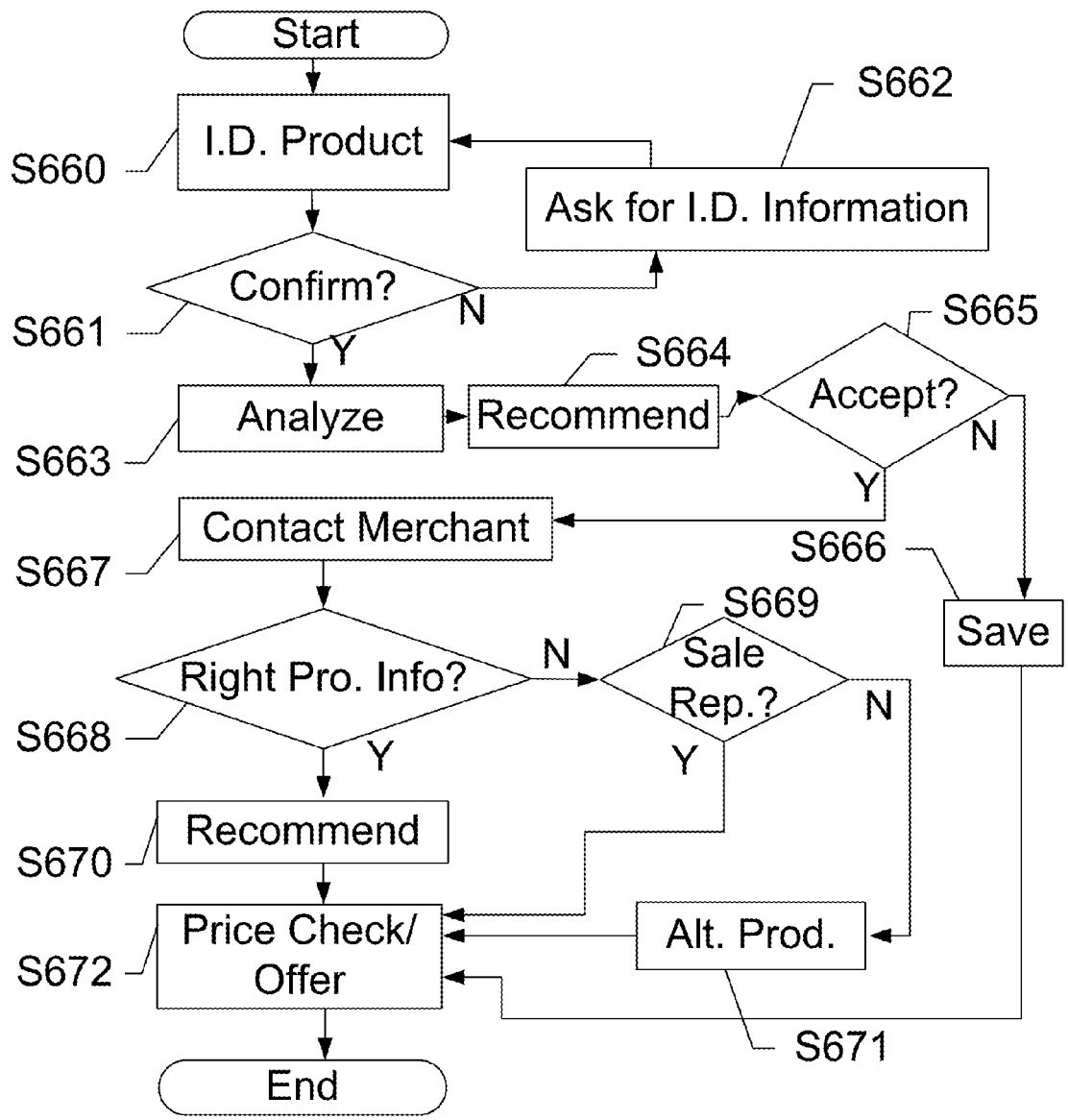
FIG. 6 shows yet another method for enhancing a user's shopping experience, according to an example embodiment of the subject disclosure.

FIG. 6 shows yet another method for enhancing a shopping experience of a user 105, according to an example embodiment of the subject disclosure. The user 105 may locate a product, which he or she may want to purchase. The product may include any personal, business, or household products. The located product may include a product identifier including a barcode, an RFID tag, etc., which may be captured and communicated to an inventory server such as inventory server 101. The product identifier may be captured by scanning a barcode of the product using a scanner or a camera, by reading product information off an RFID tag attached to the product using an RFID reader, or by capturing an image of the product using a camera. A user 105 may also enter the product identifier manually by keying in or speaking relevant information such product brand, name, etc.

The method may begin with a logic 103 embedded in the inventory server 101, identifying a product information corresponding to the product identifier captured and sent by the user 105 (S660). The logic 103 may query a database such as database 104, to determine if the product information may have been saved previously. If not, the logic 103 may direct the inventory server 101 to look at various sources on the Internet, to extract the product information. The product information corresponding to the product identifier, may include a name of the product, a brand of the product, a manufacturer of the product, etc. and even a thumbnail of the product. The result may be communicated back to the user 105 to confirm that the extracted product information corresponds to what the user may be looking for. However, if relevant product information cannot be found, inventory server 101 may suggest a variety of similar and alternative products to the user 105 to choose from.

The inventory server 101 may send the relevant product information to the user 105 for the user 105 to either confirm or reject (S661). If the user 105 rejects the product information as incorrect, the inventory server 101 may ask the user 105 to provide more information regarding the product (S662) including manually entering any information useful in identifying the product. For example if capturing the product's barcode may not be possible through a scanner, an RFID reader, etc., the user 105 may manually enter the barcode. The user 105 may even be able to speak in the numbers associated with the barcode into the microphone of the mobile device, which may be recorded, converted to text and accordingly transmitted back to the inventory server 101. Thereafter the process may revert back to S660 in order for the inventory server 101 to identify the product corresponding to the provided product identifier. Upon the user 105 confirming the product information, the logic 103 onboard the inventory server 101 may analyze the confirmed product based on a variety of factors (S663). One factor that may be used in this analysis may be a history of similar products the user 105 may have purchased in the past. For example, when a user 105 has picked up a bottle of Canola oil to purchase at a grocery store, the logic 103 may factor in types of oils previously bought by the user 105, to determine that the user 105 has always purchased Olive oil.

Another factor may be the compatibility of the product chosen by the user 105 with other products owned by the user 105. The logic 103 may factor in that a product currently chosen by the user 105 may not be compatible with neither what he or she may have always purchased in the past, nor with any other product that the user 105 may have and thus provide a recommendation accordingly. For example, the logic 103 may determine that none of the electronic devices in user's 105 home such as remote controls, kitchen appliances, radios, game consoles, or any electronic appliances may need a AAA battery and may in fact use AA batteries.

Other factors that may be used in the analysis by the logic 103 onboard the inventory server 101, may be a particular behavior of the user 105, a personal habit of the user 105, a particular seasonal habit of the user 105, etc. For example, with regard to the example of purchasing an oil product by the user 105, not only may the logic 103 determine that canola oil may have never been purchased by the user 105 in the past, but the logic 103 may also determine that the user 105 has always purchased olive oil during winter and sunflower during summer. If the user 105 is intending to purchase canola oil during the summer time, the logic 103 may then conclude that purchasing sunflower may be more suitable for the user 105 and may provide a recommendation accordingly. Moreover, a user's allergies or dietary restrictions may be accessible to the inventory server 101, and may be compared with product information such as ingredients, etc. that are sourced from the various sources described herein. For instance, a user 105 with nut allergies may have neglected to read an ingredient label for a particular product. However, this factor may be considered by the logic 103 in providing a recommendation to not purchase the product, or recommend an alternative.

Regardless of what factors may have been used in analyzing a chosen product, the logic 103 on board the inventory server 101 may conclude that an alternative product may be more suitable for the user 105 and may thus provide appropriate recommendations to the user 105 (S664). The user 105 may then have the option of accepting or declining the recommendation (S665). Should the user 105 decline the recommendation, the product information corresponding to the chosen product may be saved in the database 104 (S666) followed by a price comparison for the chosen product, after which point the process may end (S672). The inventory server 101 may perform a price check and comparison for the chosen product along with any sales, coupons, discounts, etc. offered across a variety of merchants that may be selling the recommended product, and may subsequently present the results to the user 105. The selection of merchants among which the price check and the comparison is be performed may be based on the geographical location of the user 105, the user's 105 past purchases, a list of specific merchants designated by the user 105, etc.

Should the user 105 accept the recommendation S664 in S665, the inventory sever 101 may contact a server belonging to the merchant with whom the user 105 may be currently shopping in order to retrieve more information, including where in the store the recommended product may be located or whether the merchant carries the recommended product or not (S667). There may or may not be any information available on the merchant's server 109 as to the location of the recommended product. If information pertaining to the location of the recommended product is available on the merchant's server 109, the inventory server 101 may retrieve that information from the merchant's server 109 and provide an appropriate recommendation to the user 105 (S670). Thereafter the process may move to S672, wherein the inventory server 101 may perform a price check and present offers, sales, coupons, etc. offered by a variety of merchants on the recommended product.

However, if as a result of S668 it is determined that the merchant's server 109 does not have any information regarding the recommended product, the inventory server 101 may transmit a request to the merchant's server 109 to summon one of the merchant's sales representatives to the user 105 (S669). A sales representative may also provide his or her own recommendation, which may or may not be accepted by the user 105, including helping the user 105 with additional information as to where the user 105 may find the recommended product in the merchant's store, whether the merchant carries the recommended product or not, or whether the user 105 may want to consider other products recommended by the sales representative. Merchant's sales representatives may carry an electronic device such as a pager with them at all time while working. The merchant's server 109 may communicate a notification that a customer present in the store may need assistance along with information as to the location of the user 105 within the merchant's facility. The location of the user 105 may be determined via a variety of location sensors that may be located throughout the merchant's facility, or by determining a location of the product the user 105 has scanned within the facility.

However, if no sales representatives are available to provide further assistance to the user 105, the inventory server 101 may provide the user 105 with suggestions regarding alternative merchants which may offer the exact same recommended product or similar products that may be in line with the product that the user 105 may be looking for (S671). Thereafter, the process may move to S672, wherein the inventory server 101 may perform a price check and present offers, sales, coupons, etc. offered by a variety of merchants on the recommended product.

Figure 7:
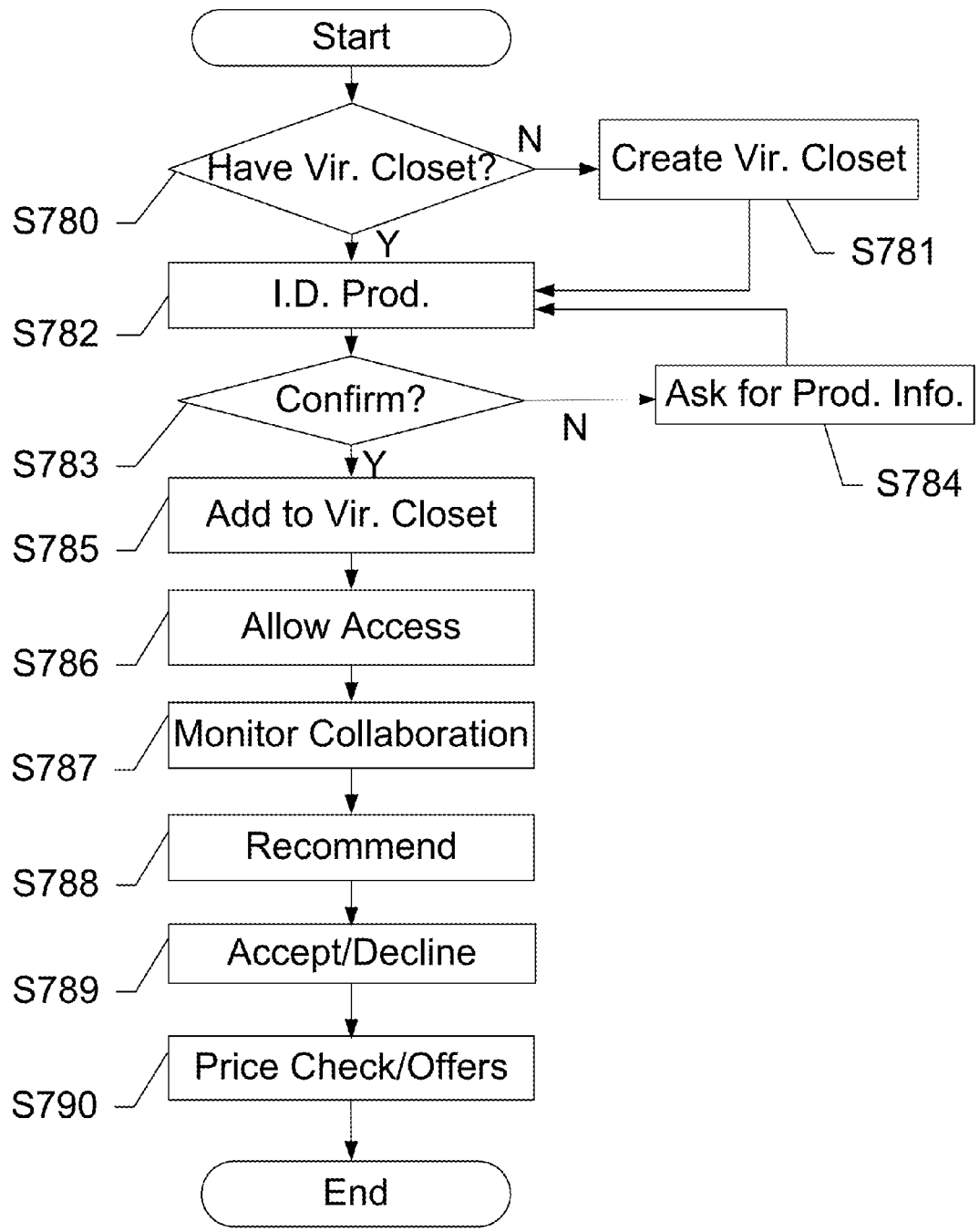
FIG. 7 shows yet another method for enhancing a user's shopping experience when the user may be shopping for personal aesthetic products, according to an example embodiment of the subject disclosure.

FIG. 7 shows yet another method for enhancing a shopping experience of a user when the user 105 may be shopping for personal aesthetic products, according to an example embodiment of the subject disclosure. A virtual closet may be created on a database such as database 104. A virtual closet may be customizable by the user 105 to reflect his or her actual closet at home as well as accurate information related to products that the user 105 might have in the real closet. Personal aesthetic products may include any type of clothes, cosmetic products, accessories that a person may wear, etc.

When a user 105 locates a personal aesthetic product he or she may want to purchase, the user 105 may send a product identifier to an inventory server such as inventory server 101. The product identifier may be captured by scanning a barcode of the product using a scanner or a camera, by reading product information off an RFID tag attached to the product using an RFID reader, or by capturing an image of the product using a camera. A user 105 may also enter the product identifier manually by keying in or speaking relevant information such product brand, name, etc. The user 105 may even be able to speak in the barcode, which may be recorded, converted to text and accordingly transmitted to the inventory server 101.

The method may begin by determining whether the user 105 already has a virtual closet or not (S780). If the user 105 does not have a virtual closet, then he or she may be given an option to create a virtual closet (S781). If a virtual closet belonging to the user 105 already exists, a logic 103 embedded within the inventory server 101 may examine the received product identifier to identify relevant personal aesthetic product information (S782). The logic 103 may query a database such as database 104, to determine if relevant personal aesthetic product information may have been saved previously. If not, the logic 103 may direct the inventory server 101 to look into various sources on the Internet, to extract relevant personal aesthetic product information. If relevant personal aesthetic product information can be found, the result may be communicated back to the user 105 to confirm that the extracted personal aesthetic product information correspond to what the user 105 may be looking for. However, if relevant personal aesthetic product information cannot be found, inventory server 101 may suggest a variety of similar and alternative products to the user 105. Next, the user 105 may be asked to confirm the relevant personal aesthetic product information sent to the user 105 by the inventory server 101 (S783). If the user 105 does not confirm the result, the inventory server 101 may ask the user 105 to provide more information regarding the product (S784). Thereafter the process may revert back to S783 in order for the inventory server 101 to identify the product corresponding to the provided product identifier.

Once the user 105 has confirmed a personal aesthetic product, the aesthetic product may be added to the virtual closet that the user 105 may have on the inventory server 101 (S785). The user 105 may wish to share the personal aesthetic product to be purchased with one or more selected contacts such as friends, family members, etc., and obtain their opinion. Consequently, the inventory server 101 may, given consent of the user 105, allow selected contacts access to the user's virtual closet (S786). The inventory server may then facilitate a collaboration among the user 105 and selected contacts and monitor their collaboration (S787). The collaboration may be facilitated via an online chat, email, text, or even a telephone conversation between the user 105 and the selected contact. Any collaboration may be monitored to determine a potential item that the user 105 may be interested in. For instance, a frequency of words, etc. may be monitored and compared to existing products stored in a store catalog of a store frequented by the user 105 or their selected contacts. Depending on content of the collaboration, the inventory server 101 may provide a recommendation to the user 105 including choosing an alternative product, choosing a higher quality product, sticking with the product the user may have chosen initially, etc. (S788). The user 105 may then be asked to accept or decline the recommendation (S789). For example, the user 105 may have chosen a red shirt initially and may have several pairs of pants in her virtual closet, but she may not be certain of which one would be a better match for the chosen red shirt. By accessing her virtual closet, selected contacts may browse the collection of pants the user 105 may already have and may provide a variety of feedback to the user 105. For example, a selected contact may inform the user that the shirts she may already have might match with her pants, or that none of the pair of pants she may have would be a proper match for the chosen red shirt, etc.

Whether the user 105 sticks to the chosen personal aesthetic product or switches products as a result of collaboration, the inventory server 101 may perform a price check and comparison for the appropriate personal aesthetic product along with any sales, coupons, discounts, etc. offered across a variety of merchants offering the product, and may subsequently present the results to the user 105 (S790). The selection of merchants across which the price check and the comparison is to be performed may be based on the geographical location of the user 105, past purchases, a list of specific merchants designated by the user 105, etc.

Figure 8:
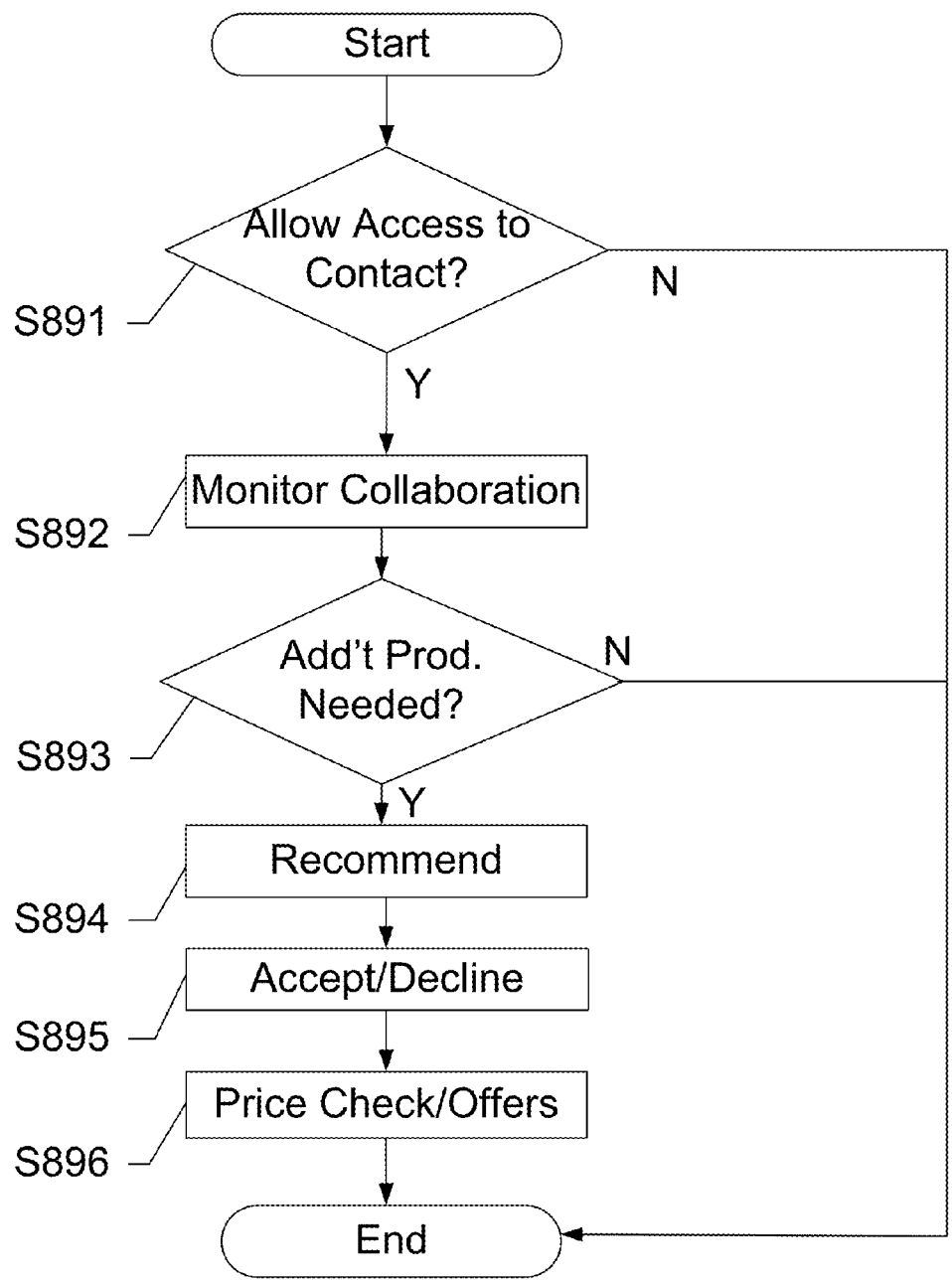
FIG. 8 shows a method by which an inventory server facilitates collaboration on personal aesthetic products of a user, according to an example embodiment of the subject disclosure.

FIG. 8 shows a method by which an inventory server 101 facilitates collaboration on personal aesthetic products of a user 105, according to an example embodiment of the subject disclosure. One or more users 105 may have a virtual closet on an inventory server such as inventory server 101. Each user 105 may select one or more contacts, whom may or may not be users and with whom the user 105 would like to share his or her virtual closet. The method may begin with the inventory server 101 allowing selected contacts access to the user's 105 virtual closet (S891). The inventory server 101 may request permission from the user 105 before allowing the selected contacts access to a virtual closet of the user 105. As the user 105 and the selected contacts collaborate, for instance using the collaboration methods described above, the inventory server 101 may monitor their collaboration (S892). For instance, the collaboration may be facilitated via an online chat, email, text, or even a telephone conversation between the user 105 and the selected contact. Any collaboration may be monitored to determine a potential item that the user 105 may be interested in. For instance, a frequency of words, etc. may be monitored and compared to existing products stored in a store catalog of a store frequented by the user 105 or their selected contacts. Further, the content of collaboration may not necessarily be to purchase a particular personal aesthetic product but rather a group of two or more contacts using the virtual closet to coordinate outfits they may wear to an event. Based on the content of collaboration, the inventory server 101 may determine that one or more of the users 105 may potentially be interested or need additional personal aesthetic products (S893). If additional personal aesthetic products are not needed, the process may end. If additional personal aesthetic products may be needed, the inventory server 101 may provide appropriate recommendations to the one or more users 105 (S894). Should the user 105 decline the recommendation provided, the process may end. However should the user 105 accept the recommendation, the inventory server 101 may perform a price check and comparison for the appropriate personal aesthetic product along with any sales, coupons, discounts, etc. offered across a variety of merchants offering the product, and may subsequently present the results to the user 105 (S895).

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. An inventory server comprising:
   a processor; and
   a memory storing instructions that, when executed by the processor, cause the processor to perform operations comprising
      communicating with a sensor to receive, from the sensor, a product identifier associated with a product,
      decoding the product identifier associated with the product to extract product information related to the product,
      updating stored product information related to the product with the product information related to the product in response to receiving the product identifier associated with the product,
      monitoring a state of the product, wherein monitoring the state of the product comprises monitoring a weight of the product remaining after a period of time,
      determining, based on monitoring the state of the product, that the state of the product falls below a threshold, and
      in response to determining that the state of the product is below the threshold, providing, to a mobile device via a wireless communication, a recommendation to attain a replacement for the product.

2. The inventory server of claim 1, wherein the product information related to the product comprises at least one of the weight of the product, an amount of the product, an expiration data associated with the product, or a date when the product is purchased.

3. The inventory server of claim 1, wherein monitoring the state of the product further comprises monitoring an expiration date associated with the product.

4. The inventory server of claim 1, wherein the sensor comprises a reader, and wherein the reader comprises an optical reader, a radio frequency identification reader, a barcode scanner, or a camera.

5. The inventory server of claim 1, wherein the operations further comprise:
   receiving, from a user, an acceptance of the recommendation to attain the replacement for the product; and
   in response to receiving the acceptance, performing a price comparison across a plurality of merchants selling the replacement for the product.

6. The inventory server of claim 5, wherein the plurality of merchants is selected based on at least one of a geographical location of the user, a list of merchants designated by the user, or past purchases associated with the user.

7. A method comprising:
communicating, by an inventory server comprising a processor, with a sensor to receive, from the sensor, a product identifier associated with a product;
decoding, by the processor, the product identifier associated with the product to extract product information related to the product;
updating, by the processor, stored product information related to the product with the product information related to the product in response to receiving the product identifier;
monitoring, by the processor, a state of the product, wherein monitoring the state of the product comprises monitoring a weight of the product remaining after a period of time;
determining, by the processor based on monitoring the state of the product, that the state of the product falls below a threshold; and
in response to determining that the state of the product is below the threshold, providing, by the processor to a mobile device via a wireless communication, a recommendation to attain a replacement for the product.

8. The method of claim 7, wherein the product information related to the product comprises at least one of the weight of the product, an amount of the product, an expiration data associated with the product, or a date when the product is purchased.

9. The method of claim 7, wherein monitoring the state of the product further comprises monitoring an expiration date associated with the product.

10. The method of claim 7, wherein the sensor comprises a reader, and wherein the reader comprises an optical reader, a radio frequency identification reader, a barcode scanner, or a camera.

11. The method of claim 7, further comprising:
receiving, from a user, an acceptance of the recommendation to attain the replacement for the product; and
in response to receiving the acceptance, performing a price comparison across a plurality of merchants selling the replacement for the product.

12. The method of claim 11, wherein the plurality of merchants is selected based on at least one of a geographical location of the user, a list of merchants designated by the user, or past purchases associated with the user.

13. A mobile device comprising:
a processor; and
a memory storing instructions that, when executed by the processor, cause the processor to perform operations comprising:
communicating with a first sensor to receive, from the first sensor, a product identifier associated with a product,
providing, to an inventory server, the product identifier associated with the product,
communicating with a second sensor monitoring a state of the product to receive, from the second sensor via a wireless communication, the state of the product, wherein the state of the product comprises a weight of the product remaining after a period of time,
providing, to the inventory server, the state of the product, and
receiving, from the inventory server in response to a determination that the state of the product is below a threshold, a recommendation to attain a replacement for the product.

14. The mobile device of claim 13, further comprising a display, wherein the operations further comprise causing the recommendation to attain the replacement for the product to be displayed on the display.

15. The mobile device of claim 13, wherein the operations further comprise providing an acceptance of the recommendation to attain the replacement for the product.

16. The mobile device of claim 15, wherein the operations further comprise receiving, based on the acceptance of the recommendation to attain the replacement for the product, a price comparison across a plurality of merchants selling the replacement for the product.

* * * * *